R. S. BATES.
PLOW.
APPLICATION FILED JULY 16, 1909.
988,850.
Patented Apr. 4, 1911.
2 SHEETS—SHEET 1.
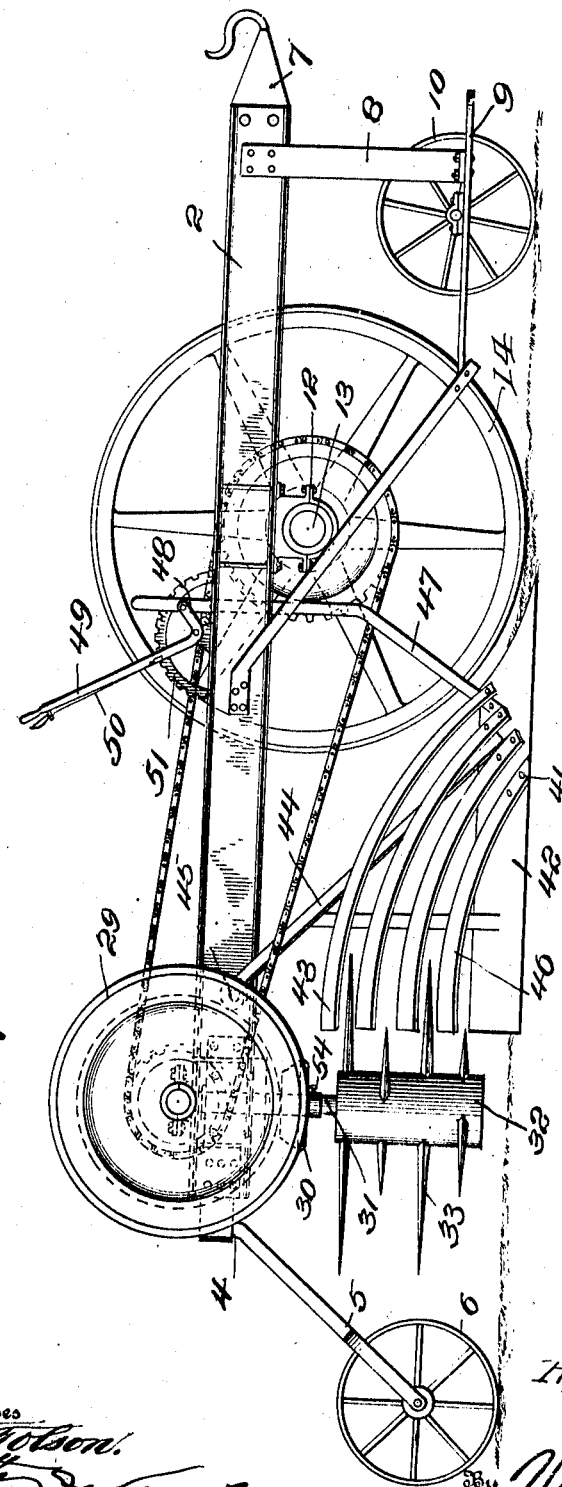
Fig. 1.
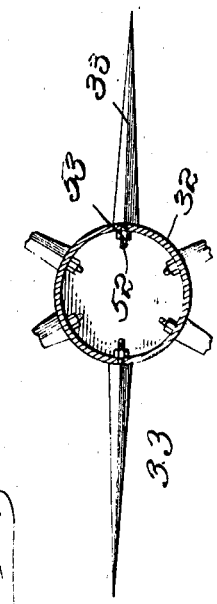
Fig. 3.
Witnesses
Inventor
Richard S. Bates.
By Victor J. Evans
Attorney

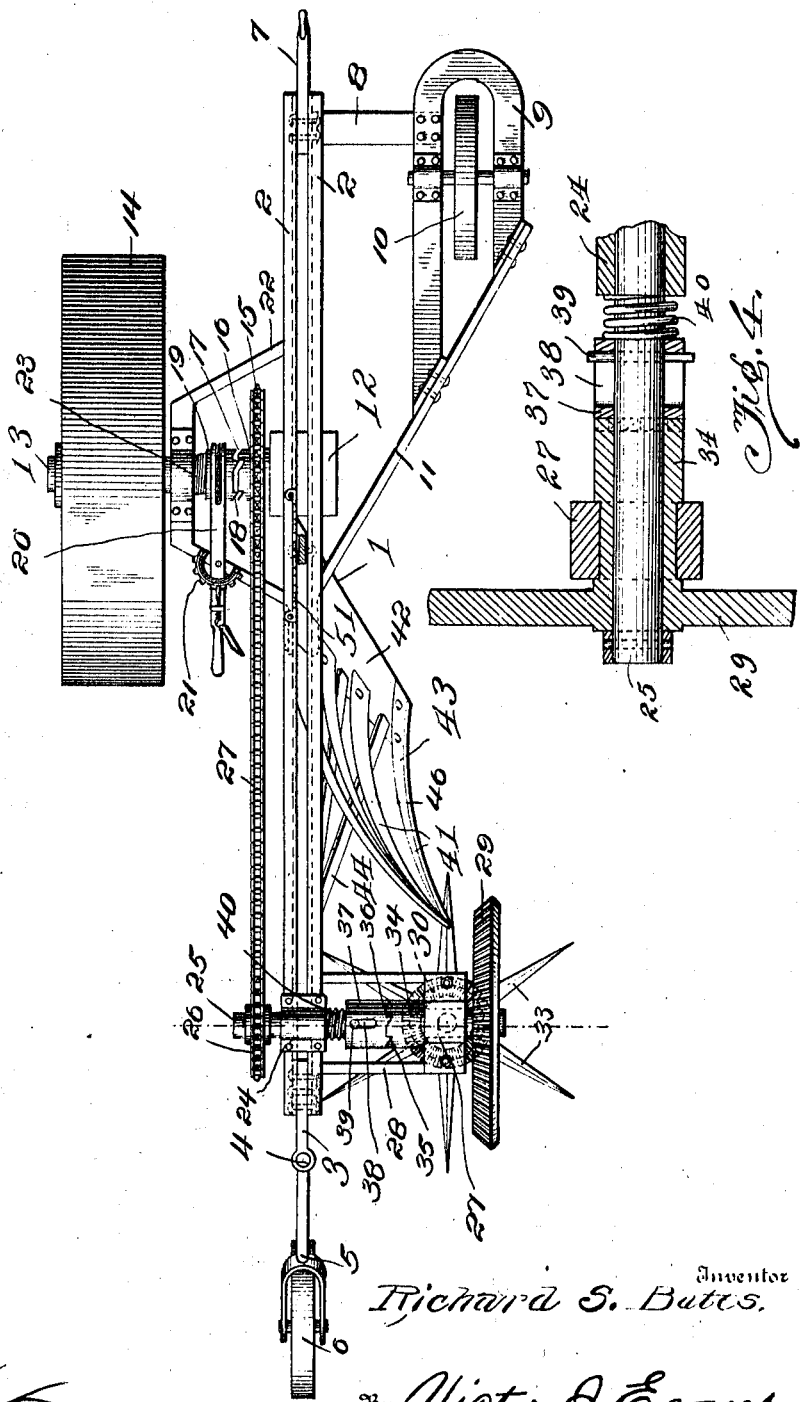

UNITED STATES PATENT OFFICE.

RICHARD S. BATES, OF STERLING, COLORADO.

PLOW.

988,850.  Specification of Letters Patent.  Patented Apr. 4, 1911.

Application filed July 16, 1909. Serial No. 508,008.

*To all whom it may concern:*

Be it known that I, RICHARD S. BATES, a citizen of the United States, residing at Sterling, in the county of Logan and State of Colorado, have invented new and useful Improvements in Plows, of which the following is a specification.

An object of the invention is to provide a plow of this character having a plurality of rearwardly extending fingers upon which the sod is adapted to travel as a furrow is made, the device being provided with a rotatable drum carrying a plurality of knives or arms which are adapted to pass between the fingers of the mold board to return the soil to the furrow made by the plow in a pulverized condition.

With the above and other objects in view which will appear as the description progresses the invention resides in the novel construction and combination of parts hereinafter fully described and claimed.

In the accompanying drawings there has been illustrated a simple and preferred embodiment of the invention and in which, Figure 1 is a side elevation of a plow constructed in accordance with the present invention. Fig. 2 is a top plan view of the same. Fig. 3 is a detail sectional view of the revolving cylinder, illustrating the manner of attaching the knives or bolts thereto. Fig. 4 is a detail sectional view illustrating the position of the spring clutch 37 upon the shaft 25 as well as the clutch member 34 carried by the beveled toothed wheel 29.

In the accompanying drawings the numeral 1 designates the device proper. In the present instance the body of the plow comprises a pair of spaced channel beams 2.
These beams extend longitudinally the full length of the body of the plow and have secured between them at their rear end an extending member 3 provided with a suitable eye which is adapted for the reception of a pintle 4 provided by a frame 5 upon which the rear wheel 6 of the device is journaled. The forward end of the beams 2 have spaced between them a suitable clevis 7 whereby the draft animals are attached. One of the beams 2 is provided with a right angular offset member 8 supporting a substantially U-shaped frame 9 within which is mounted upon suitable bearings a wheel, 10. The ends of the U-shaped member 9 are attached to the frame through the medium of an angular bar 11. Positioned upon the beams 2 through the medium of suitable retaining elements is a journal box 12 and this box is adapted to support a shaft 13 upon which is integrally mounted a main land wheel 14 of the device. The shaft 13 is provided with a suitable sprocket wheel 15 mounted upon a suitable collar 16 which is free to ride upon the shaft 13. This collar 16 is provided with teeth 17 which are adapted to mesh with similar teeth 18 carried by a collar 19 slidably mounted upon the box 12. This collar 19 is provided with an annular recessed portion which is adapted for the reception of an operating lever 20. The lever 20 is provided with a suitable spring pressed pawl which is adapted to engage between the teeth of a segment 21 which is secured upon a substantially U-shaped frame 22 connected with the channel bar 2 upon this side of the frame. It is to be understood that the collar 19 is provided with a suitable spline engaging a groove within the shaft 13 so that the said collar is adapted to revolve as the wheel 14 is rotated. Positioned between the outer face of the collar 19 and the inner face of the U-shaped bracket 22 is a helical spring 23, which is adapted to exert pressure between the head of the frame and the collar and to normally force the teeth of the collar into engagement with the collar 16.

Mounted in a suitable bearing 24 adjacent the rear of the frame of the device is an axle 25. This axle 25 is provided with a suitable sprocket wheel 26, which is adapted to engage an endless chain 27 and this chain 27 also coöperates with a sprocket wheel 15 carried by the shaft 17. The shaft 25 has its outer end engaged within a bearing 27 provided upon a frame 28 carried by the member 2 opposite to that of the sprocket wheel 26. Loosely mounted for rotation upon the outer end of the shaft 25 adjacent its bearing 27 is a beveled wheel 29 and this beveled wheel is adapted to mesh with a smaller beveled wheel 30 carried upon a vertical shaft 31. This shaft 31 has its upper extremity also mounted in a suitable bearing carried by the frame 28 and the lower portion of the shaft 31 is provided with a vertically extending cylinder 32. This cylinder 32 is provided with a plurality of spaced fingers or knives 33, the purpose of which will hereinafter be described.

The beveled wheel 29 is provided with an integrally formed collar 34 which has its outer end provided with suitable teeth 35, which are adapted to be engaged by similar teeth 36 carried by the sliding collar 37. The collar 37 is provided with an elongated slot 38 which is adapted to engage a suitable pintle 39 carried by the shaft 25 and positioned upon the shaft 25 between the bearing 24 and the outer face of the collar 37 is a helical spring 40 which is adapted to exert pressure between the two members and to force the teeth of the collar 37 into engagement with the teeth of the collar 34. It will be understood that the cylinder 32 is rotated at a comparatively high rate of speed, and by providing a structure as before described, it will be noted that the beveled wheel 29 meshes with the beveled wheel 30 whereby it will be free to rotate until the momentum of the wheel and cylinder ceases, the sliding collar 37 being detracted against the spring 40 when the beveled wheel 29 rotates in this manner.

The numeral 41 designates the plow member of the device. This plow member comprises a share 42 and a plurality of radially disposed rearwardly extending mold arms or members 43. The plow 41 is supported upon a frame of the device through the medium of suitable rods 44. The outer extremity of one of these brace rods 44 is positioned between the beams 2 and is sustained in operative position through the medium of a suitable bolt 45.

It is to be understood that the beams 2 are provided with a plurality of spaced openings so that the plow member 41 may be raised or lowered as desired and effectively retained in one of these positions while the share 42 is inoperative. Secured upon the forward end of the plow share 42 is an arm 47. This arm 47 has its upwardly extending portion pivotally connected with the offset arm 48 of the lever 49. The lever 49 is provided with a spring pressed pawl 50 which is adapted to engage between the teeth of a segment 51 carried by the members 2. By reference to Fig. 3 of the drawings it will be noted that the cylinder 32 is provided with a plurality of spaced openings and that these openings are adapted for engagement with the reduced threaded extensions 52 carried by the blades 33. The threaded extensions 52 are provided with suitable nuts 53 whereby the said blades 33 are effectively and securely connected with the cylinder 32.

By reference to Fig. 1 of the drawings it will be noted that the sprocket wheel 30 is permanently secured to the cylinder 31 and that the said sprocket is provided with a collar having a suitable set screw 54 whereby the same is retained in adjusted position upon the shaft 31. By this arrangement it will be noted that when the plow 41 is adjusted the cylinder 32 may be also adjusted so as to position the knives 33 between the arms or fingers 43 carried by the plow share 42.

From the above description, taken in connection with the accompanying drawings it will be noted that I have provided a comparatively cheap and thoroughly effective device for the purposes intended, one which is so constructed that when the clutch sleeve or collar 17 is withdrawn from the toothed collar or clutch member 15 the cylinder is free to revolve under its own momentum without interfering with the remainder of the device and it is to be understood that while I have illustrated and described the preferred embodiment of the invention as it now appears to me minor details within the scope of the following claims may be resorted to without departing from the spirit or sacrificing any of the advantages of the device.

Having thus fully described the invention what is claimed as new is:

1. In combination with a wheeled frame, an adjustable plow upon the frame, said plow having its mold board provided with spaced openings, a cylinder carried by the frame, said cylinder having spaced removable knife members adapted to be rotated between the openings of the mold board, means for rotating the cylinder when the device is in motion, and means for permitting the rotation of the cylinder when the device is halted.

2. In combination with a wheeled frame, having a mold board provided with a plurality of spaced openings, and means for adjusting the mold board, a transverse shaft connected with the frame, a chain connection between this shaft and the axle of one of the wheels, a cylinder carried by the frame and adapted to be rotated as the shaft is revolved, a plurality of spaced removable knives connected with the cylinder and adapted to pass through the openings in the mold board when the cylinder is rotated.

3. In combination with a wheeled frame having a sprocket wheel loosely mounted upon one of its axles, and a clutch for said sprocket wheel, the frame being further provided with an adjustable mold board having spaced fingers, a transverse shaft mounted upon the frame, a sprocket wheel upon this shaft, a chain connecting the said sprocket wheel with the former sprocket wheel, a slidable collar upon the transverse shaft, a spring upon the shaft normally forcing the collar in one direction, said collar having its outer face provided with teeth, a beveled toothed wheel mounted for rotation upon this shaft, said toothed wheel being also provided with a collar having teeth adapted to be engaged by the teeth of the sliding collar, a depending shaft mounted upon the frame, a toothed beveled wheel upon this shaft engaging the toothed beveled wheel of the transverse shaft, a hollow cylinder connected with the vertical shaft, said cylinder being provided with a plurality of staggered openings, knife members having reduced threaded portions for the openings of the cylinder, and securing nuts for the said reduced threaded portions.

In testimony whereof I affix my signature in presence of two witnesses.

RICHARD S. BATES.

Witnesses:
C. W. GODDARD,
L. J. COLLIERY.